United States Patent
Nomura et al.

(10) Patent No.: US 10,967,386 B2
(45) Date of Patent: Apr. 6, 2021

(54) METHOD AND MACHINE FOR PRODUCING TITANIUM COBBLES

(71) Applicant: METALDO CO., LTD., Osaka (JP)

(72) Inventors: Shingo Nomura, Osaka (JP); Keigo Kobayashi, Osaka (JP); Kazumi Takenaka, Osaka (JP)

(73) Assignee: METALDO CO., LTD., Osaka (JP)

( * ) Notice: Subject to any disclaimer, the term of this patent is extended or adjusted under 35 U.S.C. 154(b) by 45 days.

(21) Appl. No.: 16/483,355

(22) PCT Filed: Feb. 21, 2019

(86) PCT No.: PCT/JP2019/006624
§ 371 (c)(1),
(2) Date: Aug. 2, 2019

(87) PCT Pub. No.: WO2019/167804
PCT Pub. Date: Sep. 6, 2019

(65) Prior Publication Data
US 2021/0008568 A1   Jan. 14, 2021

(30) Foreign Application Priority Data
Feb. 27, 2018   (JP) ............................. JP2018-033414

(51) Int. Cl.
*B02C 23/14*   (2006.01)
*B02C 21/00*   (2006.01)
(Continued)

(52) U.S. Cl.
CPC .............. *B02C 23/14* (2013.01); *B02C 21/00* (2013.01); *B03C 1/30* (2013.01); *B07B 1/36* (2013.01);
(Continued)

(58) Field of Classification Search
CPC ........ B02C 13/04; B02C 13/284; B02C 23/10; B02C 23/14; B02C 23/16; B02C 21/00;
(Continued)

(56) References Cited

U.S. PATENT DOCUMENTS 3,905,556 A * 9/1975 Drage ..................... C22B 7/005
                                                          241/19
4,363,722 A * 12/1982 Dresty, Jr. ............... B03B 9/04
                                                          209/3
(Continued)

FOREIGN PATENT DOCUMENTS

| CN | 108823412 A | 11/2018 |
| JP | H05-68948 A | 3/1993 |

(Continued)

OTHER PUBLICATIONS

English Translation of JP 2002-115005; Inv: Kato et al.; Pub. Date: Apr. 2002 (Year: 2002).*

(Continued)

*Primary Examiner* — Joseph C Rodriguez
(74) *Attorney, Agent, or Firm* — Maschoff Brennan

(57) ABSTRACT

A method of producing titanium cobbles includes: a preparation step of preparing a scrap material containing 50% by mass or more of metal titanium; a first crushing step of roughly crushing the scrap material using a first crusher; a second crushing step of crushing the scrap material, which has been roughly crushed in the first crushing step, using a second crusher; a dust collection step of collecting fine dust of the scrap material generated in the second crushing step; and a first classification step of classifying products obtained by crushing the scrap material, which have been generated in the second crushing step, into medium particles with particle sizes within a predetermined particle size range, large particles with particle sizes larger than the particle size (Continued)

range, and small particles with particle sizes smaller than the particle size range.

3 Claims, 3 Drawing Sheets

(51) Int. Cl.
    *B03C 1/30*      (2006.01)
    *B07B 1/36*      (2006.01)
    *B08B 15/02*     (2006.01)
    *B09B 5/00*      (2006.01)
    *C22B 1/00*      (2006.01)
    *C22B 1/248*     (2006.01)
    *C22B 34/12*     (2006.01)

(52) U.S. Cl.
    CPC .............. *B08B 15/02* (2013.01); *B09B 5/00* (2013.01); *C22B 1/005* (2013.01); *C22B 1/248* (2013.01); *C22B 34/1204* (2013.01); *B03C 2201/20* (2013.01); *B07B 2201/04* (2013.01)

(58) Field of Classification Search
    CPC ......... B07B 1/36; B07B 2201/04; B09B 5/00; C22B 1/005; C22B 1/248; C22B 34/1204; B03C 1/30; B08B 15/02
    See application file for complete search history.

(56) References Cited

U.S. PATENT DOCUMENTS

| | | | | |
|---|---|---|---|---|
| 4,416,688 A | * | 11/1983 | Greenwait | ............... C22B 1/11 75/359 |
| 7,635,100 B2 | * | 12/2009 | Zhang | ................. C21B 3/08 241/23 |
| 8,109,392 B2 | * | 2/2012 | Byrne | ................. B07B 9/00 209/34 |
| 2006/0207387 A1 | | 9/2006 | Soran et al. | |
| 2008/0257794 A1 | * | 10/2008 | Valerio | ................. B03B 9/061 209/567 |
| 2010/0159247 A1 | | 6/2010 | Kaya et al. | |

FOREIGN PATENT DOCUMENTS

| | | |
|---|---|---|
| JP | H06-170276 A | 6/1994 |
| JP | 2001-149911 A | 6/2001 |
| JP | 2002-115005 A | 4/2002 |
| JP | 2002-348162 A | 12/2002 |
| JP | 3369234 B2 | 1/2003 |
| JP | 2005-036637 A | 2/2005 |
| JP | 2006-104633 A | 4/2006 |
| JP | 2008-080299 A | 4/2008 |
| JP | 2008-537015 A | 9/2008 |
| JP | 2008-279422 A | 11/2008 |
| JP | 2009-061357 A | 3/2009 |
| JP | 2010-234223 A | 10/2010 |
| JP | 2011-224441 A | 11/2011 |
| JP | 4907284 B2 | 3/2012 |
| JP | 2012219364 A | 11/2012 |
| JP | 2014-124602 A | 7/2014 |
| JP | 2017-140555 A | 8/2017 |
| WO | 2006/101539 A1 | 9/2006 |

OTHER PUBLICATIONS

JP Office Action dated May 29, 2018 as received in Application No. 2018-033414.

JP Office Action dated Aug. 21, 2018 as received in Application No. 2018-033414.

JP Written Opinion dated Oct. 22, 2018 as received in Application No. 2018-033414.

JP Grant of Patent dated Dec. 18, 2018 as received in Application No. 2018-033414.

* cited by examiner

METHOD AND MACHINE FOR PRODUCING TITANIUM COBBLES

TECHNICAL FIELD

The present disclosure relates to a method and a machine for producing titanium cobbles.

BACKGROUND ART

A method of crushing and classifying waste of, for example, composite materials and iron-based materials, and thereby recycling the waste has been known (see e.g., Patent Documents 1 and 2).

CITATION LIST

Patent Documents

Patent Document 1: Japanese Patent No. 3369234
Patent Document 2: Japanese Patent No. 4907284

SUMMARY OF THE INVENTION

Technical Problem

Because of characteristics such as a light weight, a high strength, and a high corrosion resistance, titanium has been used in various general and industrial applications. Since titanium has a limited production amount, recycling is important.

However, there has been the following problem if titanium cobbles that are titanium-containing particles are produced by, for example, crushing a scrap material containing titanium as a method of recycling a scrap material. That is, the amount of crush needs to be limited to reduce ignition in crushing the scrap material, and it is thus difficult to produce a large amount of titanium cobbles with a uniform particle size in a high yield. Patent Documents 1 and 2 fail to disclose a method of producing titanium cobbles from a scrap material containing titanium.

To address the problem, it is an object of the present disclosure to provide a method and a machine for crushing a titanium scrap material, while maintaining the safety, and producing a large amount of titanium cobbles with a uniform particle size in a high yield.

Solution to the Problem

In order to achieve the object, a first aspect of the present disclosure is directed to a method of producing titanium cobbles. The method includes: a preparation step of preparing a scrap material containing 50% by mass or more of metal titanium; a first crushing step of roughly crushing the scrap material using a first crusher; a second crushing step of crushing the scrap material, which has been roughly crushed in the first crushing step, using a second crusher; a dust collection step of collecting fine dust of the scrap material generated in the second crushing step; and a first classification step of classifying products obtained by crushing the scrap material, which have been generated in the second crushing step, into medium particles with particle sizes within a predetermined particle size range, large particles with particle sizes larger than the particle size range, and small particles with particle sizes smaller than the particle size range.

According to the first aspect, the scrap material containing 50% by mass or more of metal titanium is crushed in two stages. This configuration can reduce excessive frictional heat generated by contact between metal materials, and reduce firing in crushing. The collection of the fine dust, which is easily ignited and may be a main cause of firing, in the dust collection step can reduce possible ignition of the fine dust. Even if a spark occurs, the temperature of the fine dust can be lowered to reduce ignition of the other products obtained by crushing the scrap material. The classification of the products obtained by crushing the scrap material, which have been obtained in the two-stage crushing steps, into three types of particles in the first classification step allows production of a large amount of the titanium cobbles with a uniform particle size in a high yield.

A second aspect of the present disclosure is an embodiment of the first aspect. In the second aspect, the scrap material is at least one selected from the group consisting of a plate material, a tube material, a side trimming material, and a blank material, and the scrap material is a waste material with a thickness of 3 mm or smaller and a length of 1 m or shorter.

According to the second aspect, a large amount of the titanium cobbles with a uniform particle size can be produced in a high yield.

A third aspect of the present disclosure is the first or second aspect. In the third aspect, the first crusher is a biaxial crusher, and the second crusher is a hammer mill.

According to the third aspect, the crushing in two stages using the combination of the biaxial crusher and the hammer mill allows production of a large amount of the titanium cobbles with a uniform particle size in a high yield.

A fourth aspect of the present disclosure is an embodiment of any one of the first to third aspects. In the fourth aspect, the method further includes: a first magnetic separation step of removing a magnetic particle from the medium particles; and a return step for returning the large particles to the second crushing step.

According to the fourth aspect, the removal of the magnetic particle in the first magnetic separation step allows production of the titanium cobbles with high quality in a high yield. The returning of the large particles, which have been obtained in the first classification step, to the second crushing step in the return step ensures production of a sufficient amount of the titanium cobbles.

A fifth aspect of the present disclosure is an embodiment of any one of the first to fourth aspects. In the fifth aspect, the method further includes: a collection step of collecting the fine dust, which has been collected in the dust collection step, and the small particles; a second magnetic separation step of removing a magnetic particle from an aggregate of the fine dust and the small particles; and a second classification step of classifying the aggregate into at least two or more types of particles.

According to the fifth aspect, collecting and further classifying fine particles allow obtaining of titanium cobbles with even smaller particle sizes as by-products, and effective recycling of the scrap material.

A sixth aspect of the present disclosure is an embodiment of any one of the first to fifth aspects. In the sixth aspect, the predetermined particle size range is between 3 mm and 50 mm.

According to the sixth aspect, the method allows production of a large amount of the titanium cobbles with a uniform particle size in a high yield.

A machine for producing titanium cobbles according to a seventh aspect includes: a first crusher that roughly crushes a scrap material containing 50% by mass or more of metal titanium; a second crusher that crushes the scrap material roughly crushed by the first crusher; a dust collector that collects fine dust generated in crushing the scrap material using the second crusher; and a sieving machine that classifies products obtained by crushing the scrap material, which have been generated in crushing the scrap material using the second crusher, into medium particles with particle sizes within a predetermined particle size range, large particles with particle sizes larger than the particle size range, and small particles with particle sizes smaller than the particle size range.

According to the seventh aspect, the scrap material containing 50% by mass or more of metal titanium is crushed in two stages using the first crusher and the second crusher. This configuration can reduce excessive frictional heat and firing in crushing. The collection of the fine dust, which is easily ignited and may be a main cause of firing, by the dust collector can reduce possible ignition of the fine dust. Even if a spark occurs, the temperature of the fine dust can be lowered to reduce ignition of the other products obtained by crushing the scrap material. The classification of the products obtained by crushing the scrap material, which have been obtained in the two crushing stages, into three types of particles using the sieving machine allows production of a large amount of the titanium cobbles with a uniform particle size in a high yield.

An eighth aspect of the present disclosure is an embodiment of the seventh aspect. In the eighth aspect, the machine further includes: a first magnetic separator that removes a magnetic particle from the medium particles; and a conveyor that returns the large particles to the second crusher.

According to the eighth aspect, the returning of the large particles, which have been obtained by the sieving machine, to the second crusher ensures production of a sufficient amount of the titanium cobbles. The removal of the magnetic particles by the first magnetic separator allows production of high-quality titanium cobbles in a high yield.

A ninth aspect of the present disclosure is an embodiment of the seventh or eighth aspect. In the ninth aspect, the sieving machine is a vibration sieving machine including two types of mesh materials with different hole sizes, the mesh materials are two upper and lower mesh materials. The upper mesh material has a hole size of 50 mm. The lower mesh material has a hole size of 3 mm. The products obtained by crushing the scrap material are placed on the upper mesh material.

According to the ninth aspect, the particles can be effectively classified by the two upper and lower mesh materials, which makes it possible to produce a large amount of the titanium cobbles with a uniform particle size in a high yield.

Advantages of the Invention

As described above, according to the present disclosure, the scrap material containing 50% by mass or more of metal titanium is crushed in two stages. This configuration can reduce excessive frictional heat generated by contact between metal materials, and reduce firing in crushing. The collection of the fine dust, which is easily ignited and may be a main cause of firing, in the dust collection step can reduce possible ignition of the fine dust. Even if a spark occurs, the temperature of the fine dust can be lowered to reduce ignition of the other products obtained by crushing the scrap material. The classification of the products obtained by crushing the scrap material, which have been obtained in the two-stage crushing steps, into three types of particles in the first classification step allows production of a large amount of the titanium cobbles with a uniform particle size in a high yield.

DESCRIPTION OF EMBODIMENTS

An embodiment of the present disclosure will now be described in detail with reference to the drawings. The following description of preferred embodiment is merely an example in nature, and is not intended to limit the scope, applications or use of the present disclosure.

First Embodiment

<Definition>

In this specification, "titanium cobbles" refer to titanium-containing particles, each containing 50% by mass or more of metal titanium, and having a maximum size of 50 mm or smaller and an aspect ratio of 5 or lower, which is obtained by dividing the maximum size by a minimum size.

In this specification, the "maximum size" refers to a maximum width of an outer shape of a particle, and the "minimum size" refers to a minimum width of the outer shape of the particle.

In this specification, the "particle size" of a particle such as a titanium cobble refers to the maximum size of the particle.

<Method and Machine for Producing Titanium Cobbles>

Figure 1:
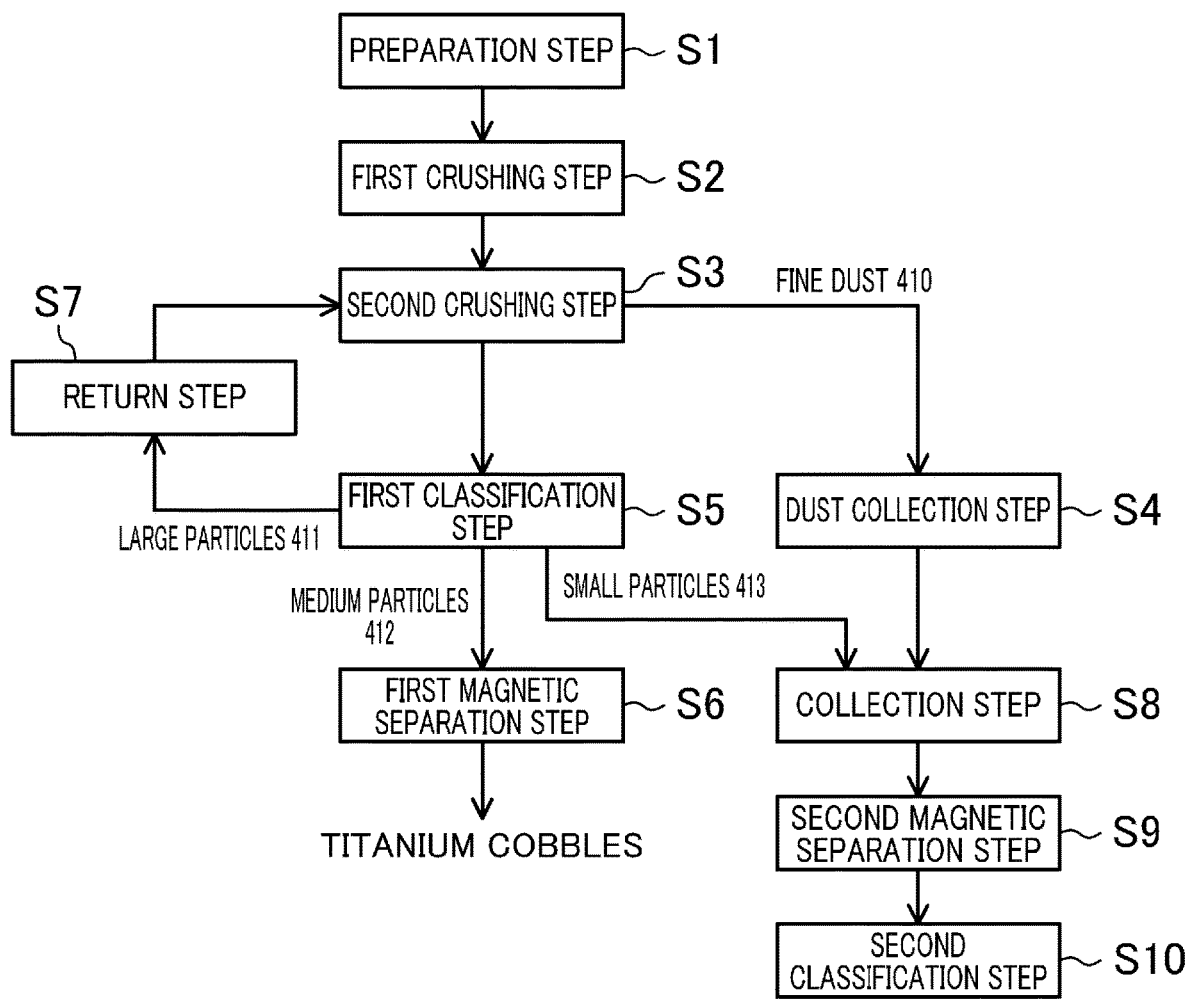
FIG. 1 is a flowchart for explaining a method of producing titanium cobbles according to an embodiment of the present disclosure.

As shown in FIG. 1, a method of producing titanium cobbles according to an embodiment of the present disclosure includes a preparation step S1, a first crushing step S2, a second crushing step S3, a dust collection step S4, a first classification step S5, a first magnetic separation step S6, a return step S7, a collection step S8, a second magnetic separation step S9, and a second classification step S10.

Figure 2:
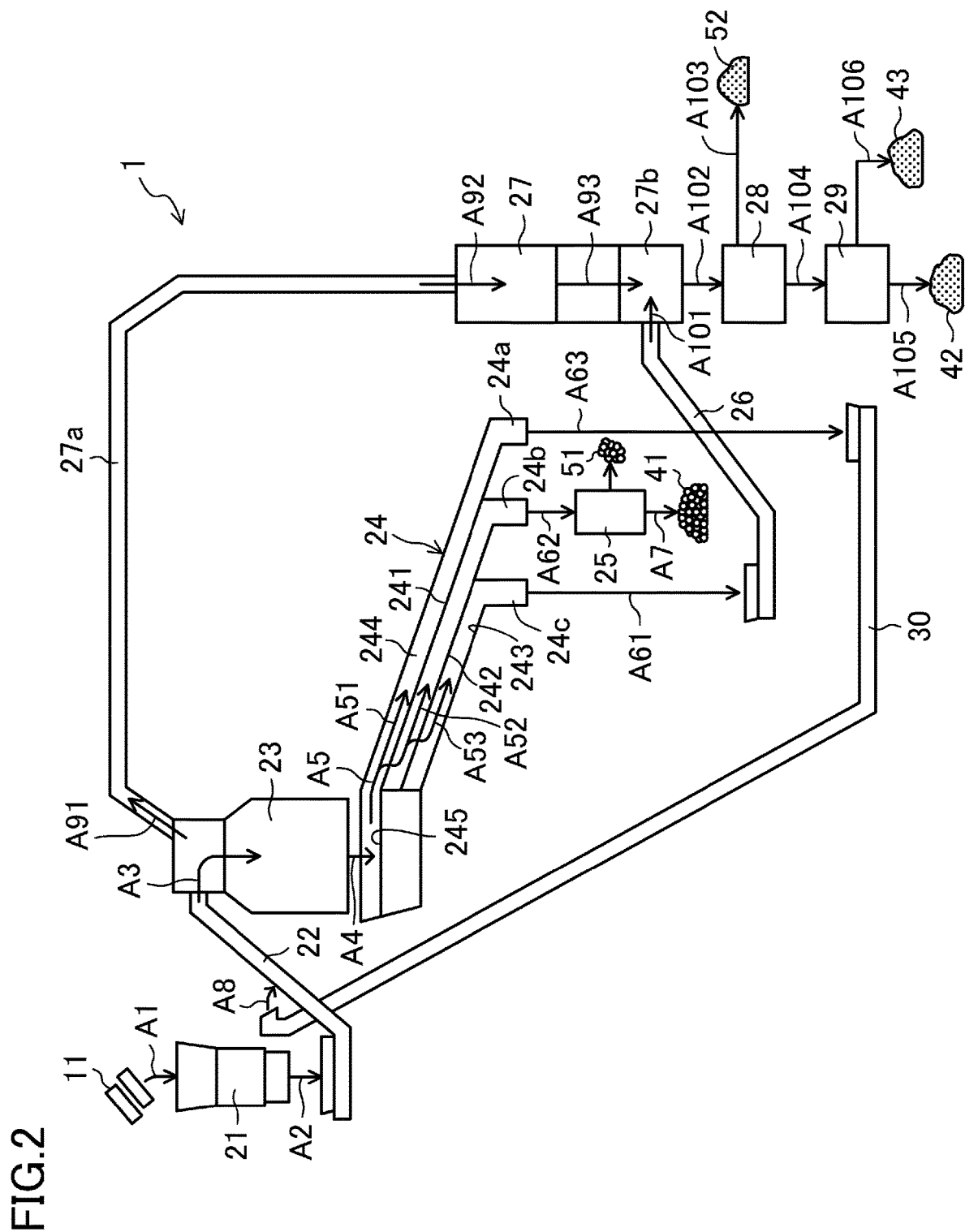
FIG. 2 is a diagram illustrating an example of a production machine for producing titanium cobbles by the method of producing the titanium cobbles shown in FIG. 1.

FIG. 2 illustrates an example of a production machine 1 for producing titanium cobbles by the titanium cobbles production method shown in FIG. 1.

Now, the outline of a process of producing titanium cobbles according to this embodiment will be described with reference to FIGS. 1 and 2.

<Outline of Process of Producing Titanium Cobbles>

As indicated by an arrow A1 in FIG. 2, a scrap material 11 prepared in the preparation step S1 of FIG. 1 is introduced into a first crusher 21 to be roughly crushed (the first crushing step S2).

As indicated by arrows A2 and A3, the scrap material 11, which has been roughly crushed by the first crusher 21, is conveyed by a first conveyor 22, introduced into a second crusher 23, and crushed (the second crushing step S3).

At an upper portion of the second crusher 23, a duct 27a is disposed, which is connected to a dust collector 27. Fine dust 410, which has been generated when the scrap material 11 is crushed by the second crusher 23, is sucked by the dust collector 27 and is collected through the duct 27a (the dust collection step S4) as indicated by arrows A91 and A92. Then, as indicated by an arrow A93, the fine dust 410 is transferred to a collecting section 27b disposed at the bottom of the dust collector 27.

As indicated by an arrow A4, the scrap material 11, which has been crushed by the second crusher 23, is introduced into an inlet 245 of a first sieving machine 24 (i.e., a sieving machine). Then, as indicated by an arrow A5, the scrap material 11 is transferred to a sieving section 244 of the first sieving machine 24. The sieving section 244 includes a first mesh 241 (i.e., an upper mesh material), a second mesh 242 (i.e., a lower mesh material), and a bottom 243. Then, as shown in FIG. 1 and indicated by arrows A51, A52, and A53 in FIG. 2, the scrap material 11 introduced into the inlet 245 is classified into three types of particles: large particles 411; medium particles 412; and small particles 413, by the first mesh 241 and the second mesh 242 (the first classification step S5).

The medium particles 412 are discharged from a second outlet 24b of the first sieving machine 24 and introduced into a first magnetic separator 25 as indicated by an arrow A62. Then, magnetic medium particles 51 exhibiting magnetism are removed from the medium particles 412 by the first magnetic separator 25. In this manner, titanium cobbles 41 as commercial products are obtained as indicated by an arrow A7 (the first magnetic separation step S6).

As indicated by an arrow A63, the large particles 411 are discharged from a first outlet 24a of the first sieving machine 24, and introduced into an intermediate portion of the first conveyor 22 by a second conveyor 30 (i.e., a conveyor). The large particles 411 are then introduced into the second crusher 23 again, that is, return to the second crushing step S3 (the return step S7).

As indicated by arrows A61 and A101, the small particles 413 are discharged from a third outlet 24c of the first sieving machine 24 and transferred to the collecting section 27b, which is provided at the bottom of the dust collector 27, by a third conveyor 26. The small particles 413 are then collected together with the fine dust 410, which has been collected by the dust collector 27 (the collection step S8).

The aggregate of the fine dust 410 and the small particles 413 is transferred from the collecting section 27b to a second magnetic separator 28, as indicated by an arrow A102. Then, as indicated by an arrow A103, a magnetic aggregate 52 exhibiting magnetism is removed from the aggregate described above by the second magnetic separator 28 (the second magnetic separation step S9).

The aggregate, from which the magnetic aggregate 52 has been removed, is transferred to a second sieving machine 29 as indicated by an arrow A104, and is classified as indicated by arrows A105 and A106 into fine titanium cobbles 42 and small titanium cobbles 43 according to the particle sizes (the second classification step S10).

<Steps>

Figure 3:
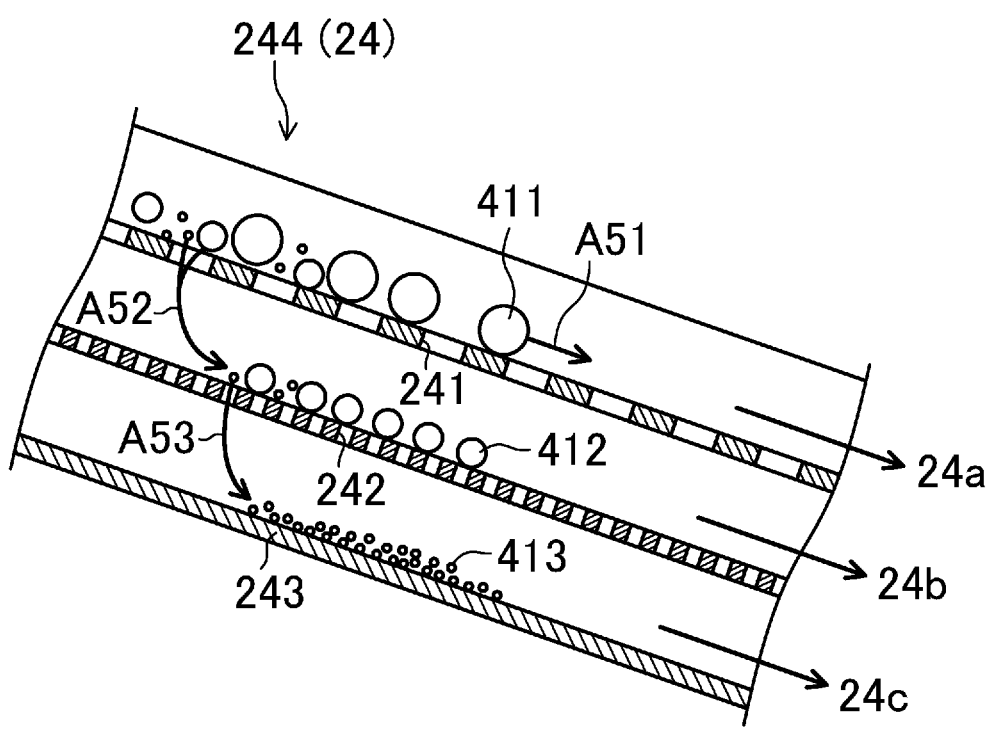
FIG. 3 is a diagram schematically illustrating a partial cross-sectional view of a sieving section of a sieving machine in the production machine of FIG. 2.

Now, the steps of producing titanium cobbles will be described below with reference to FIGS. 1 to 3.

<<Preparation Step>>

In the preparation step S1, the scrap material 11 is prepared.

The scrap material 11 is a waste material (e.g., used waste or machining waste generated in, for example, processing plants of manufactures) which contains 50% by mass or more of metal titanium, 60% by mass or more of metal titanium in a more preferred embodiment, and 80% by mass or more of metal titanium in a particularly preferred embodiment. The type of the scrap material 11 is not particularly limited. Examples of the scrap material 11 include a plate material, a tube material, a side trimming material, a blank material, a punch material, and a coil material. In a preferred embodiment, the type is at least one selected from the group consisting of a plate material, a tube material, a side trimming material, and a blank material. Specifically, examples of the plate material include a waste material such as a strip remnant which is left over after manufacturing commercial products to a maximum processing yield. Examples of the tube material include a waste material generated in the manufacture of parts for a heat exchanger and a seawater desalination plant. Examples of the side trimming material include a waste material generated in the manufacture of a plate material by cutting off an end of a titanium coil. Examples of the blank material include a remnant which is left over after punching e.g., a raw plate material into a product having a circumferentially closed shape. Examples of the punch material include a punched portion generated by punching e.g., a raw plate material into a product having a circumferentially closed shape. Examples of the coil material include a waste material such as a defectively processed product generated in cold rolling of a raw plate material and a defective product with damage or a dent.

In order to produce a large amount of the titanium cobbles 41 with a uniform particle size in a high yield, while maintaining the safety, the scrap material 11 may have a thickness of 3 mm or smaller, and a thickness in a range from 0.4 mm to 2 mm in a preferred embodiment, and a length of 1 m or shorter, and 0.8 m (800 mm) or shorter in a preferred embodiment. If the scrap material 11 is a tube material, the tube has an outer diameter of 20 mm or smaller in a preferred embodiment. If the waste material has a size which exceeds the range described above, the waste material may be cut in advance by, for example, a shear, so that the size falls within the range, to prepare the scrap material 11.

<<First Crushing Step>>

In the first crushing step S2, the scrap material 11 is roughly crushed by the first crusher 21.

In the first crushing step S2, the first crusher 21 roughly crushes the scrap material 11 into a maximum size of 500 mm or smaller, 300 mm or smaller in a preferred embodiment, and 200 mm or smaller in a more preferred embodiment.

Any known crusher may be used as the first crusher 21 as long as the crusher is suitable for roughly crushing the scrap material 11. Examples of the first crusher 21 include a uniaxial crusher, a biaxial crusher, a quadriaxial crusher, and an alligator shear. In a particularly preferred embodiment, a biaxial crusher is used as the first crusher 21 in order to reduce the load in crushing the scrap material 11 using the second crusher 23 in the subsequent step, and obtain products by crushing the scrap material, and hence the titanium cobbles 41, with a uniform particle size in a short time.

If a biaxial crusher is employed as the first crusher 21, the crusher may include a motor with a power within a range, for example, from 30 kW to 200 kW, although the configuration is not particularly limited. The crusher may also include a crushing chamber with a horizontal cross-sectional area (e.g., width×depth if the chamber is a cuboid) within a range, for example, from 0.2 $m^2$ to 6 $m^2$. This allows effective crushing of the scrap material 11.

<<Second Crushing Step>>

In the second crushing step S3, the scrap material 11, which has been roughly crushed by the first crusher 21, is crushed by the second crusher 23.

The second crusher 23 crushes the scrap material 11, which has been roughly crushed by the first crusher 21, into a maximum size of 150 mm or smaller in a preferred embodiment, 100 mm or smaller in a more preferred embodiment, and 80 mm or smaller in a particularly preferred embodiment.

Any known crusher may be used as the second crusher 23 as long as the crusher is suitable for crushing the scrap material 11. Examples of the second crusher 23 include a hammer mill, a disc mill, a jet mill, a uniaxial crusher, a biaxial crusher, and a quadriaxial crusher. In a particularly preferred embodiment, a hummer mill is used as the second crusher 23 in order to obtain the titanium cobbles 41 with a uniform particle size in a short time.

If a hammer mill is employed as the second crusher 23, the crusher may include a motor with a power within a range, for example, from 50 kW to 150 kW, although the configuration is not particularly limited. The crusher may also include a crushing chamber with a horizontal cross-sectional area (e.g., width×depth if the chamber is a cuboid) within a range, for example, from 0.2 $m^2$ to 3 $m^2$. The hammer mill may include a mesh screen at an outlet of the products obtained by crushing the scrap material. The mesh size of the screen may be, as described above, adjusted as appropriate by changing screens according to a desired size of the products obtained by crushing the scrap material. The upper limit of the mesh size of the screen is 150 mm or smaller in a preferred embodiment, 100 mm or smaller in a more preferred embodiment, and 80 mm or smaller in a particularly preferred embodiment. The lower limit of the mesh size of the screen is not particularly limited, but the lower limit is 10 mm or larger in a preferred embodiment, 20 mm or larger in a more preferred embodiment, and 30 mm or larger in a particularly preferred embodiment in order to shorten the crushing time using the hammer mill and improve the safety of the production machine 1. The rate of introducing the scrap material 11 into the hammer mill is variable in accordance with, for example, the size and state of a blade of the hammer mill, the capacity of the crushing chamber, and the processability, such as an output of the motor. The rate is 5 kg/min or lower in a preferred embodiment, 3 kg/min or lower in a more preferred embodiment, and 2 kg/min or lower in a particularly preferred embodiment, per horizontal cross-sectional area 1 $m^2$ of the crushing chamber, in order to reduce the amount of frictional heat generated in crushing and improve the safety of the production machine 1.

As described herein, the scrap material 11 is crushed in two stages of the first crushing step S2 and the second crushing step S3. This configuration reduces the amount of frictional heat generated by contact between scrap materials 11, contact between the scrap material 11 and the inner wall of the first crusher 21, and contact between the scrap material 11 and the inner wall of the second crusher 23, thereby maintaining the safety in crushing.

In particular, using a biaxial crusher as the first crusher 21 and a hammer mill as the second crusher 23 allows production of a large amount of the titanium cobbles with a uniform particle size in a high yield in a short time.

The time after rough crushing with the first crusher 21 until the material is introduced into the second crusher 23 is two minutes or longer in a preferred embodiment, three minutes or longer in a more preferred embodiment, and four minutes or longer in a particularly preferred embodiment, in order to reduce the amount of frictional heat generated in crushing with the second crusher 23 and improve the safety of the production machine 1.

<<Dust Collection Step>>

In the dust collection step S4, fine dust, which has been generated in crushing the scrap material 11 with the second crusher 23, is collected by the dust collector 27.

Examples of the dust collector 27 include a cyclone dust collector that separates and collects fine dust with a swirling airflow and a centrifugal force, a pulse jet dust collector, and a bag filter dust collector. The dust collector 27 is a cyclone dust collector in a preferred embodiment. The fine dust generated by the second crusher 23 is collected by the dust collector 27 through the duct 27a. The fine dust, which is easily ignited by frictional heat, is collected to reduce the ignition of the fine dust. Even if a spark occurs, the temperature of the fine dust is lowered to reduce ignition of the other products obtained by crushing the scrap material, thereby making it possible to improve the safety of the production machine 1. In a case in which a cyclone dust collector is employed as the dust collector 27, dust with high specific gravities among the fine dust 410 collected through the duct 27a is transferred to the collecting section 27b, whereas the other dust with low specific gravities may be stored in a dust collecting bag (not shown).

<<First Classification Step>>

In the first classification step S5, the products obtained by crushing the scrap material 11, which have been generated in the second crushing step S3, are classified into the medium particles 412 with particle sizes within a predetermined particle size range, the large particles 411 with particle sizes larger than the predetermined particle size range, and the small particles 413 with particle sizes smaller than the predetermined particle size range.

The predetermined particle size range may be set as appropriate in accordance with desired particle sizes of the titanium cobbles 41. The upper limit of the predetermined particle size range is 50 mm or smaller, 30 mm or smaller in a preferred embodiment, and 25 mm or smaller in a more preferred embodiment in order to produce a large amount of the titanium cobbles with a uniform particle size in a high yield. The lower limit of the predetermined particle size range is 3 mm or larger, 3.5 mm or larger in a preferred embodiment, and 4 mm or larger in a particularly preferred embodiment. In this case, the particle sizes of the large particles 411 are larger than 50 mm, larger than 30 mm in a preferred embodiment, and larger than 25 mm in a more preferred embodiment. On the other hand, the particle sizes of the small particles 413 are smaller than 3 mm in a preferred embodiment, smaller than 3.5 mm in a more preferred embodiment, and smaller than 4 mm in a particularly preferred embodiment.

A case will now be described on the assumption that the predetermined particle size range is between 3 mm and 50 mm, for example.

In this case, the large particles 411 have particle sizes larger than 50 mm; the medium particles 412 have particle sizes within the range from 3 mm to 50 mm, and the small particles 413 have particle sizes smaller than 3 mm.

The first sieving machine 24 is a vibration sieving machine. FIG. 3 is a partially enlarged schematic cross-sectional view of the sieving section 244 of the first sieving machine 24. As shown in FIG. 3, the sieving section 244 includes the first mesh 241, the second mesh 242, and the bottom 243. The sieving section 244 has a substantially U-shaped cross-section in a direction perpendicular to the travel direction of the particles (e.g., the direction of an arrow A51 in FIG. 2). The sieving section 244 includes an outer wall part (not shown) made of metal such as stainless steel, and extends in the travel direction. The bottom 243 forms the bottom of the outer wall part. The first mesh 241 and the second mesh 242 are for classifying the products obtained by crushing the scrap material 11 according to the particle sizes. Holes with desired hole sizes are punched in metal plates made of, for example, stainless steel to form the first mesh 241 and the second mesh 242. The configurations of the first mesh 241 and the second mesh 242 are not limited thereto and may be, for example, metal nets. The first mesh 241 and the second mesh 242 are detachably attached to two upper and lower mounting portions provided on a side wall of the outer wall part. The first mesh 241 and the second mesh 242 are two types of plate mesh materials with different hole sizes. The sieving section 244 includes the first mesh 241 and the second mesh 242, which are two upper and lower meshes. The first mesh 241 has a hole size of 50 mm, while the second mesh 242 has a hole size of 3 mm.

As shown in FIG. 2, the products obtained by crushing the scrap material, which have been introduced into the inlet 245 of the first sieving machine 24, are transferred onto the first mesh 241 in accordance with the vibrations of the first sieving machine 24. Then, as shown in FIGS. 2 and 3, the large particles 411 with the maximum sizes larger than 50 mm remain on the first mesh 241, and are delivered to the first outlet 24a. The medium particles 412 with the maximum sizes within the range from 3 mm to 50 mm and the small particles 413 with the maximum sizes smaller than 3 mm pass through the holes of the first mesh 241, and are placed on the second mesh 242, located below the first mesh 241, in accordance with the vibrations of the first sieving machine 24. The medium particles 412 remain on the second mesh 242, and are delivered to the second outlet 24b. On the other hand, the small particles 413 pass through the holes of the second mesh 242, and are placed onto the bottom 243, located below the second mesh, in accordance with the vibrations of the first sieving machine 24. The small particles 413 are delivered to the third outlet 24c.

As described above, the first and second meshes 241 and 242, which are two upper and lower meshes, of the first sieving machine 24, allow effective classification of the products of the crashed scrap material 11. Eventually, a large amount of the titanium cobbles 41 with a uniform particle size can be produced in a high yield.

As shown in FIG. 2, the first outlet 24a at the end of the first mesh 241 extends toward the second conveyor 30. The first outlet 24a may be connected to the second conveyor 30. The second outlet 24b at the end of the second mesh 242 extends toward the first magnetic separator 25. The second outlet 24b may be connected to the first magnetic separator 25.

In a case of changing the predetermined particle size range, the hole sizes of the first mesh 241 and the second mesh 242 may be changed as desired. Specifically, in a case of setting the predetermined particle size range to be, for example, between 5 mm and 30 mm, the first mesh 241 and the second mesh 242 may be changed from those with hole sizes of 50 mm and 3 mm to those with hole sizes of 30 mm and 5 mm, respectively. The particle sizes of the titanium cobbles 41 can be adjusted by changing the first mesh 241 and the second mesh 242 to those with different hole sizes as described above.

<<First Magnetic Separation Step>>

In the first magnetic separation step S6, magnetic particles are removed from the medium particles 412 by the first magnetic separator 25. In this step, the medium particles 412 are eventually divided into the titanium cobbles 41 as commercial products and the magnetic medium particles 51 exhibiting magnetism as by-products. The first magnetic separator 25 is not particularly limited. A general magnetic separator, such as a drum type or a twin pole drum type, may be employed.

According to this step, removal of the magnetic medium particles 51 improves the quality of the titanium cobbles 41.

It is desirable to have the first magnetic separation step S6 in order to improve the quality of the titanium cobbles 41. However, the first magnetic separation step S6 is an optional step, and may be omitted if, for example, the scrap material 11 surely contains no magnetic particles. In this case, the medium particles 412 are obtained as the titanium cobbles 41 as commercial products.

<<Return Step>>

In the return step S7, the large particles 411 are returned to the second crusher 23 by the second conveyor 30. The returning of the large particles to the second crushing step S3 ensures production of a sufficient amount of the titanium cobbles 41.

Note that the return step S7 is an optional step, and may not be provided. However, the return step S7 is desirably provided to sufficiently recycle the scrap material 11 and ensure production of a sufficient amount of the titanium cobbles 41.

If the return step S7 is provided, the large particles 411 may be introduced into the second crusher 23 by another method, e.g., manually. The end of the second conveyor device 30 is arranged to introduce the objects conveyed, into the intermediate portion of the first conveyor 22, but the arrangement is not limited thereto. The end of the second conveyor device 30 may be arranged to introduce the objects conveyed, directly into the second crusher 23, or may be arranged to introduce the objects conveyed, into a starting end of the first conveyor 22.

<<Collection Step>>

In the collection step S8, the fine dust 410 collected in the dust collection step S4 and the small particles obtained in the first classification step S5 are collected. The collection step S8 is an optional step and may not be provided. It is desirable to have the collection step S8 in a case in which the fine dust 410 and the small particles 413 are classified in the second classification step S10 to obtain recycled products. In a case of providing the collection step S8, the dust 410 and the small particles 413 may be mixed and uniformized in the collecting section 27b.

<<Second Magnetic Separation Step>>

In the second magnetic separation step S9, magnetic particles (i.e., the magnetic aggregate 52) are removed from the fine dust 410 and the small particles 413 by the second magnetic separator 28. Although the second magnetic separator 28 is not particularly limited, a magnetic separator similar to the first magnetic separator 25 may be employed. Note that the first magnetic separator 25 and the second magnetic separator 28 may have the same configuration or different configurations. The second magnetic separation step S9 is an optional step and may not be provided. It is desirable too have the second magnetic separation step S9 in a case in which the fine dust 410 and the small particles 413 are classified in the second classification step S10 to obtain recycled products.

<<Second Classification Step>>

In the second classification step S10, the aggregate is classified into at least two or more types by the second sieving machine 29. The second sieving machine 29 may be, for example, a vibration sieving machine with a configuration similar to that of the first sieving machine 24, or may be a circular vibration sieving machine. The second sieving machine 29 may also be an ultrasonic vibration sieving machine.

The second classification step S10 is an optional step and may not be provided. It is desirable to have the second classification step S10 in a case in which the fine dust 410 and the small particles 413 are recycled as commercial products.

In the second classification step S10, fine particles are collected and further classified, thereby making it possible to obtain, as by-products, titanium cobbles with smaller particle sizes, and effectively recycle the scrap material 11.

The second classification step S10 classifies the titanium cobbles into two types of cobbles: the fine titanium cobbles 42 and the small titanium cobbles 43. However, second classification step S10 may classify the titanium cobbles into three or more types of cobbles.

<Titanium Cobbles>

The titanium cobbles 41 obtained in the manner as described above are used for, for example, a titanium ingot raw material, a superalloy, an additive material for, for example, an aluminum alloy or steel.

The yield of the titanium cobbles 41 obtained by the production method according to this embodiment is 70% or higher, 75% or higher in a preferred embodiment, and 80% or higher in a particularly preferred embodiment, where a mass ratio of the titanium cobbles 41 to the scrap material 11 is expressed in percentages. The combined yield of the titanium cobbles 41 and the fine and small titanium cobbles 42 and 43, which are products in the second classification step S10, is 80% or higher, 85% or higher in a preferred embodiment, and 90% or higher in a particularly preferred embodiment, where a mass ratio of the sum of the titanium cobbles 41, the fine titanium cobbles 42, and the small titanium cobbles 43 to the scrap material 11 is expressed in percentages.

According to the production method and the production machine 1 of the present embodiment, a time from when the scrap material 11 is introduced into the first crusher 21 until when the titanium cobbles 41 are obtained is one hour or shorter, 40 minutes or shorter in a preferred embodiment, and 30 minutes or shorter in a particularly preferred embodiment.

Other Embodiments

Now, other embodiments according to the present disclosure will be described in detail. In the description of these embodiments, the same reference characters as those in the first embodiment are used to represent equivalent elements, and the detailed explanation thereof will be omitted.

The first sieving machine 24 is a vibration sieving machine in the first embodiment. However, the first sieving machine 24 may be, for example, a circular or drum type vibration sieving machine, or ultrasonic vibration sieving machine like the second sieving machine 29.

The first sieving machine 24 includes the first mesh 241 and the second mesh 242, which are two upper and lower meshes, to classify the scrap material 11, which has been crushed by the second crusher 23, into the large particles 411, the medium particles 412, and the small particles 413. The first sieving machine 24 may further include one or more mesh materials to classify the scrap material 11 into four or more types of particles. In the first classification step S5, more detailed classification with various particle sizes allows production of titanium cobbles with various sizes.

INDUSTRIAL APPLICABILITY

The present disclosure provides a method and a machine for crushing a titanium scrap material, while maintaining the safety, and producing a large amount of titanium cobbles with a uniform particle size in a high yield. The present disclosure is thus significantly useful.

DESCRIPTION OF REFERENCE CHARACTERS

1 Production Machine (Machine for Producing Titanium Cobbles)
11 Scrap Material
21 First Crusher
23 Second Crusher
24 First Sieving Machine (Sieving Machine)
25 First Magnetic Separator
27 Dust Collector
27b Collecting Section
28 Second Magnetic Separator
29 Second Sieving Machine
30 Second Conveyor (Conveyor)
41 Titanium Cobbles
42 Fine Titanium Cobbles
43 Small Titanium Cobbles
241 First Mesh (Upper Mesh Material)
242 Second Mesh (Lower Mesh Material)
243 Bottom
410 Fine Dust
411 Large Particles
412 Medium Particles
413 Small Particles
S1 Preparation Step
S2 First Crushing Step
S3 Second Crushing Step
S4 Dust Collection Step
S5 First Classification Step
S6 First Magnetic Separation Step
S7 Return Step
S8 Collection Step
S9 Second Magnetic Separation Step
S10 Second Classification Step

The invention claimed is:

1. A method of producing titanium cobbles for use for at least one of a titanium ingot raw material, a superalloy, an additive material for an aluminum alloy, or an additive material for steel, the titanium cobbles being titanium-containing particles, each containing 50% by mass or more of metal titanium, and having a maximum size of 50 mm or smaller and an aspect ratio of 5 or lower, the aspect ratio being obtained by dividing the maximum size by a minimum size, the method comprising:
   a preparation step of preparing a scrap material containing 50% by mass or more of metal titanium;
   a first crushing step of roughly crushing the scrap material using a first crusher;
   a second crushing step of crushing the scrap material, which has been roughly crushed in the first crushing step, using a second crusher;
   a dust collection step of collecting fine dust of the scrap material generated in the second crushing step;
   a first classification step of classifying products obtained by crushing the scrap material, which have been generated in the second crushing step, into medium particles with particle sizes of 3 mm or larger and 50 mm or smaller, large particles with particle sizes larger than 50 mm, and small particles with particle sizes smaller than 3 mm;

a collection step of collecting the fine dust, which has been collected in the dust collection step, and the small particles;

a second magnetic separation step of removing a magnetic particle from an aggregate of the fine dust and the small particles; and a second classification step of classifying the aggregate into at least two or more types of particles, wherein:

time after rough crushing of the scrap material with the first crusher until the scrap material is introduced into the second crusher is two minutes or longer, and time from when the scrap material is introduced into the first crusher until when the titanium cobbles are obtained is 40 minutes or shorter.

2. A method of producing titanium cobbles for use for at least one of a titanium ingot raw material, a superalloy, an additive material for an aluminum alloy, or an additive material for steel, the titanium cobbles being titanium-containing particles, each containing 50% by mass or more of metal titanium, and having a maximum size of 50 mm or smaller and an aspect ratio of 5 or lower, the aspect ratio being obtained by dividing the maximum size by a minimum size, the method comprising:

a preparation step of preparing a scrap material containing 50% by mass or more of metal titanium;

a first crushing step of roughly crushing the scrap material using a first crusher;

a second crushing step of crushing the scrap material, which has been roughly crushed in the first crushing step, using a second crusher;

a dust collection step of collecting fine dust of the scrap material generated in the second crushing step;

a first classification step of classifying products obtained by crushing the scrap material, which have been generated in the second crushing step, into medium particles with particle sizes of 3 mm or larger and 50 mm or smaller, large particles with particle sizes larger than 50 mm, and small particles with particle sizes smaller than 3 mm;

a collection step of collecting the fine dust, which has been collected in the dust collection step, and the small particles;

a second magnetic separation step of removing a magnetic particle from an aggregate of the fine dust and the small particles; and a second classification step of classifying the aggregate into at least two or more types of particles, wherein:

the first crusher is a biaxial crusher, the second crusher is a hammer mill, time after rough crushing of the scrap material with the first crusher until the scrap material is introduced into the second crusher is two minutes or longer, and time from when the scrap material is introduced into the first crusher until when the titanium cobbles are obtained is 40 minutes or shorter.

3. A method of producing titanium cobbles for use for at least one of a titanium ingot raw material, a superalloy, an additive material for an aluminum alloy, or an additive material for steel, the titanium cobbles being titanium-containing particles, each containing 50% by mass or more of metal titanium, and having a maximum size of 50 mm or smaller and an aspect ratio of 5 or lower, the aspect ratio being obtained by dividing the maximum size by a minimum size, the method comprising:

a preparation step of preparing a scrap material containing 50% by mass or more of metal titanium;

a first crushing step of roughly crushing the scrap material using a first crusher;

a second crushing step of crushing the scrap material, which has been roughly crushed in the first crushing step, using a second crusher;

a dust collection step of collecting fine dust of the scrap material generated in the second crushing step;

a first classification step of classifying products obtained by crushing the scrap material, which have been generated in the second crushing step, into medium particles with particle sizes of 3 mm or larger and 50 mm or smaller, large particles with particle sizes larger than 50 mm, and small particles with particle sizes smaller than 3 mm;

a first magnetic separation step of removing a magnetic particle from the medium particles;

a return step for returning the large particles to the second crushing step;

a collection step of collecting the fine dust, which has been collected in the dust collection step, and the small particles;

a second magnetic separation step of removing a magnetic particle from an aggregate of the fine dust and the small particles; and a second classification step of classifying the aggregate into at least two or more types of particles, wherein:

time after rough crushing of the scrap material with the first crusher until the scrap material is introduced into the second crusher is two minutes or longer, and time from when the scrap material is introduced into the first crusher until when the titanium cobbles are obtained is 40 minutes or shorter.

* * * * *